(12) United States Patent
Yamamoto et al.

(10) Patent No.: US 8,287,033 B2
(45) Date of Patent: Oct. 16, 2012

(54) CONSTRUCTION MACHINE

(75) Inventors: Keiji Yamamoto, Hiroshima (JP);
Yoshiaki Murakami, Hiroshima (JP);
Masakazu Ozaki, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 187 days.

(21) Appl. No.: 12/832,331

(22) Filed: Jul. 8, 2010

(65) Prior Publication Data
US 2011/0025096 A1    Feb. 3, 2011

(30) Foreign Application Priority Data

Jul. 29, 2009    (JP) .................................. 2009-176046

(51) Int. Cl.
*E02F 9/24* (2006.01)

(52) U.S. Cl. .............. 296/190.03; 296/190.01; 296/1.04

(58) Field of Classification Search ................. 296/1.04, 296/187.01, 187.03, 187.13, 190.01, 190.03; 212/291; E02F 09/24; B62D 25/08
See application file for complete search history.

(56) References Cited

FOREIGN PATENT DOCUMENTS

| JP | 8-302742 | 11/1996 |
|---|---|---|
| JP | 2008-105669 | 5/2008 |
| JP | 2008-291541 | 12/2008 |
| JP | 2009-137393 | 6/2009 |
| WO | WO 01/32476 A1 | 5/2001 |
| WO | WO 2008/147410 A1 | 12/2008 |

OTHER PUBLICATIONS

Extended European Search Report issued Nov. 11, 2010, in Patent Application No. 10169514.6.
U.S. Appl. No. 12/832,413, filed Jul. 8, 2010, Yamamoto, et al.

*Primary Examiner* — Dennis Pedder
*Assistant Examiner* — Jason S Daniels
(74) *Attorney, Agent, or Firm* — Oblon, Spivak, McClelland, Maier & Neustadt, L.L.P.

(57) ABSTRACT

In a construction machine such as a hydraulic excavator in which a boom of a working attachment is arranged to one of the left and right sides of a cab into which an operator gets on, a load transmission member for transmitting a lateral load imposed on the cab at the time of rollover of a machine main body to the boom serving as a load receiving member is attached to a side surface of the boom in a state that the load transmission member is elastically deformable taking a boom attachment point as a supporting point, further, a projection piece is provided for this load transmission member, and a clearance is formed between this projection piece and a left end surface of a top plate of the boom.

7 Claims, 4 Drawing Sheets

CONSTRUCTION MACHINE

BACKGROUND OF THE INVENTION

1. Field of the Invention

The present invention relates to a construction machine in which a boom of a working attachment is arranged to one of the left and right sides of a cab into which an operator gets on.

2. Description of the Related Art

In a hydraulic excavator, as shown in FIGS. 7 and 8, an upper rotating body 2 is disposed on a crawler type lower traveling body 1 rotatably around an axis O vertical to a ground, and a cab 4 serving as an operator chamber in which an operator gets on is provided on one of the left and right sides (hereinafter, a case where the cab is provided on the left side will be described) of an upper frame 3 of this upper rotating body 2. Further, a working attachment 6 provided with a boom 5 is attached to the right side of this cab 4 so as to be raised and lowered.

In FIG. 7, the reference numeral 7 denotes a counterweight provided at a rear end of the upper frame 3.

The cab standard (ROPS) regulates that at the time of rollover (tipover) of a machine main body, deformation of the cab 4 (sometimes called as displacement, shown by a long dashed double-short dashed line in FIG. 8) has to be suppressed so as to ensure operator space called as DLV (Deflection-Limiting Volume) in the cab against a lateral load W (refer to FIG. 8) imposed on the cab 4 toward the boom 5 (the right side).

In order to comply with this ROPS standard, as shown in Patent Documents 1 and 2, there is a configuration in which a load transmission member is provided on a side surface or the like of the boom 5, and the lateral weight W from the cab 4 is transmitted to a load receiving member (the boom 5, or an exclusive member attached to the boom 5 or the like) via this load transmission member.

[Patent Document 1] Japanese Patent Laid-Open No. 2008-105669
[Patent Document 2] Japanese Patent Laid-Open No. 2008-291541

In this case, the lateral load is transmitted to the load receiving member as soon as the cab 4 is brought into contact with the load transmission member, that is, contact between the cab 4 and the load receiving member becomes just earlier by the load transmission member. Therefore, energy of the load itself cannot be reduced.

Thus, although movement of the cab 4 toward the boom can be suppressed, the deformation of the cab 4 is still not sufficiently suppressed.

SUMMARY OF THE INVENTION

The present invention is to provide a construction machine capable of exerting a function of absorbing energy of a lateral load so as to enhance an effect of suppressing deformation of a cab.

A construction machine of the present invention includes: a lower traveling body; an upper rotating body disposed on the lower traveling body rotatably around an axis vertical to the ground; a working attachment including a boom attached to the upper rotating body; a cab provided on one of the left and right sides of the working attachment on the upper rotating body, an operator getting on the cab; a load receiving member for receiving a lateral load imposed on the cab toward the boom at the time of rollover of the construction machine; and a load transmission member for transmitting the lateral load from the cab to the load receiving member. Further, the load transmission member is provided on the boom in a state that a clearance is formed between the load transmission member and the load receiving member.

According to the present invention, on the premise that the lateral load imposed on the cab at the time of the rollover of the machine is transmitted to the load receiving member via the load transmission member, the load transmission member is provided on the boom in a state that the clearance is formed between the load transmission member and the load receiving member. Therefore, the load transmission member is deformed within the clearance, and then brought into contact with the load receiving member, so that a load transmission action is started.

That is, the energy of the lateral load is absorbed by a deformation action of the load transmission member in the clearance, and the load itself imposed on the cab can be reduced by this energy absorption function.

Therefore, the effect of suppressing the deformation of the cab can be enhanced.

In the above configuration, preferably, the load transmission member is attached to the boom in a state that the load transmission member is elastically deformable within the clearance taking an attachment point to the boom as a supporting point.

In this case, the load transmission member is elastically deformed taking the attachment point to the boom as the supporting point, so as to exert the energy absorption function. Therefore, in comparison to a case where the same function is obtained by plastic deformation, the load transmission member is surely deformed in the substantially same direction irrespective of variation in strength of the load transmission member, a manner of imposing a load and the like, so as to exert the energy absorption function and a load transmission function.

In any of the above configurations, preferably, the load transmission member has a projection piece projecting toward the load receiving member, and is provided on the boom in a state that the clearance is formed between this projection piece and the load receiving member. Further, in this configuration, preferably, the boom is formed by a top plate, a base plate, and both left and right side plates, and the load transmission member is attached to the boom in a state that the projection piece faces an end surface on the cab side of the top plate of the boom serving as the load receiving member through the clearance.

In this case, the projection piece is provided on the load transmission member, and the clearance is formed between this projection piece and the load receiving member. Therefore, a part to be brought into contact with the load receiving member is determined to be the projection piece, and consequently the load transmission action is surely performed. Size of the clearance is easily controlled, and the load transmission member is easily attached to the boom.

In a case where the boom is formed by the top plate, the base plate, and the left and right side plates, the projection piece is brought into contact with the end surface on the cab side of the top plate of the boom. Therefore, there is no fear that the load receiving member itself is deformed, and the effect of suppressing the deformation of the cab is surely obtained.

In a hydraulic excavator shown in FIGS. 7 and 8, a heavy counterweight 7 is provided at a rear end of the upper rotating body 2. Therefore, the machine is rolled over not just sideways but in a rather-twisted state so that the left rear side of the cab 4 first touches the ground. Thus, there is a possibility that the load is applied to the cab 4 from the obliquely rear side.

In this case, in any of the above configurations of the present invention, preferably, a rear receiving surface for receiving the load from the rear side of the load transmission member is provided for the load transmission member. Further, in this configuration, preferably, the rear receiving surface is formed into a surface inclined downward toward a base end of the boom when seen from above.

In this case, since the rear receiving surface for receiving the load from the rear side is provided for the load transmission member, the energy absorption function and the load transmission function can be exerted for the above load.

Particularly according to the sixth aspect of the present invention in which the rear receiving surface is not formed into a vertical surface but into a surface inclined downward toward the base end of the boom when seen from above, the rear receiving surface is surely brought into contact with the cab so as to exert the energy absorption function and the load transmission function, even when the deformation of the cab varies.

In any of the above configurations of the present invention, preferably, the load transmission member includes a main body, and an attachment portion to be attached to the boom, and the main body is formed into a box shape with closed peripheries.

In this case, since the load transmission member is formed by the main body formed into a box shape with the closed peripheries, and the attachment portion to be attached to the boom, the entire load transmission member is light. Therefore, required strength and rigidity can be ensured while suppressing an increase in the total weight of the boom, and the load transmission function can be surely exerted.

In any of the above configurations of the present invention, preferably, the load transmission member is detachably attached to the boom.

In this case, the load transmission member is detachably attached to the boom, and therefore, the load transmission member can be removed from a machine which is to clear the ROPS standard with other configurations (such as a configuration in which a reinforcing frame is attached to the cab) and from a machine which is not covered by the standard, and the load transmission member can be exchanged with another member having larger strength at the request of a user.

DESCRIPTION OF THE PREFERRED EMBODIMENTS

An embodiment of the present invention will be described with FIGS. 1 to 6.

Figure 7:
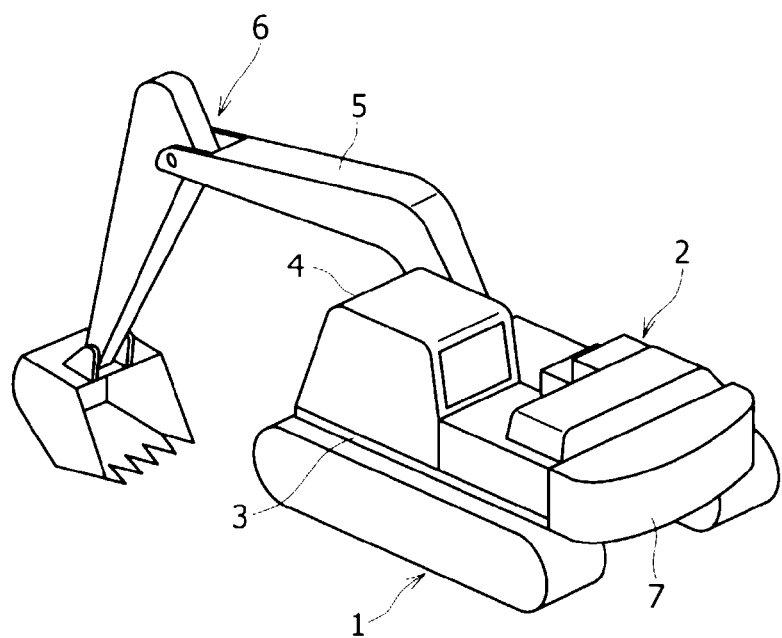
FIG. 7 is a schematic perspective view of the entire hydraulic excavator.
Figure 8:
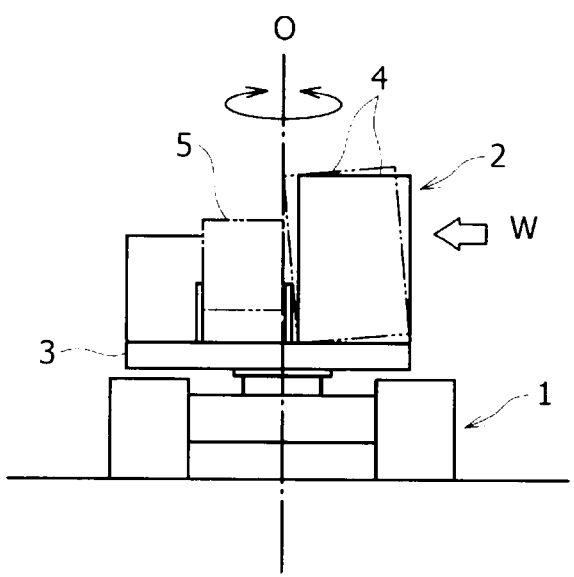
FIG. 8 is a front view of the entire hydraulic excavator.

In the embodiment, the same parts as parts shown in FIGS. 7 and 8 are given the same reference numerals, and duplicated description thereof is omitted.

In the embodiment, a boom 5 serves as a load receiving member, and a lateral load imposed on a cab 4 at the time of rollover of a construction machine is received by the boom 5.

The boom 5 is formed into a box shape by a top plate 8, a base plate 9, and both left and right side plates 10, 11. A base end of the boom is attached to an upper frame 3 of an upper rotating body 2 shown in FIGS. 7 and 8 by a boom hoot pin 12. Thereby, the boom 5 can be raised and lowered relative to the boom hoot pin 12.

Figure 1:
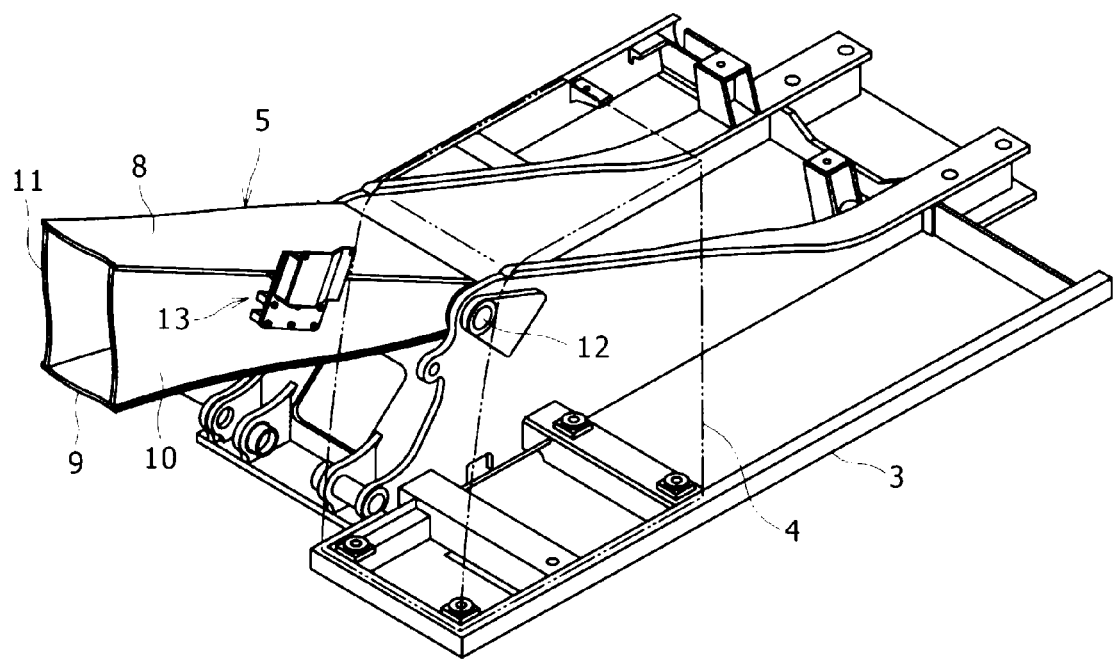
FIG. 1 is a perspective view of an upper frame and part of a boom of a hydraulic excavator according to an embodiment of the present invention.
Figure 2:
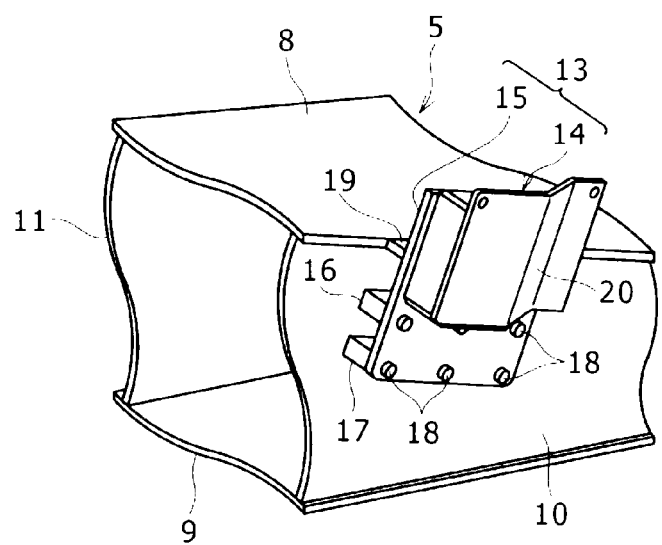
FIG. 2 is a partially enlarged view of FIG. 1.
Figure 3:
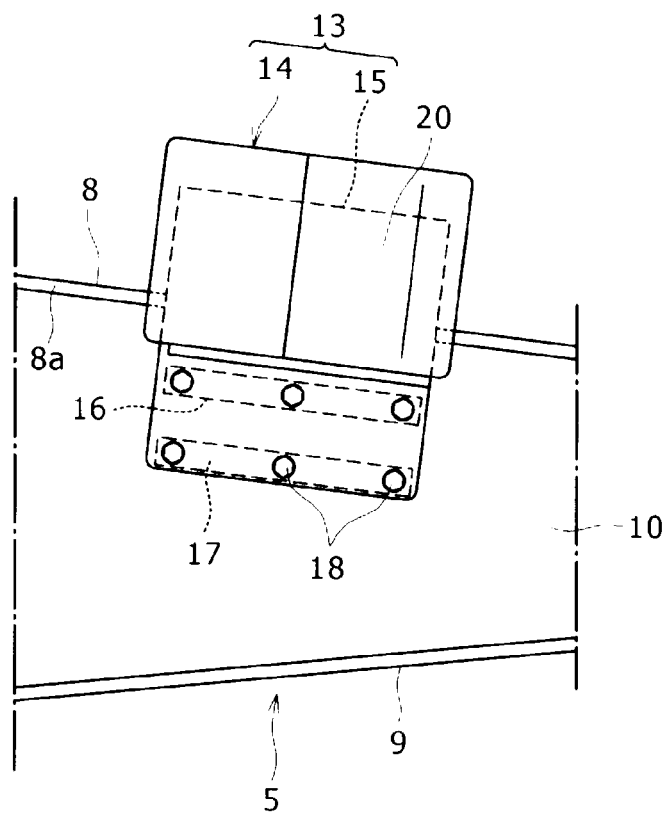
FIG. 3 is a side view of FIG. 2.
Figure 4:
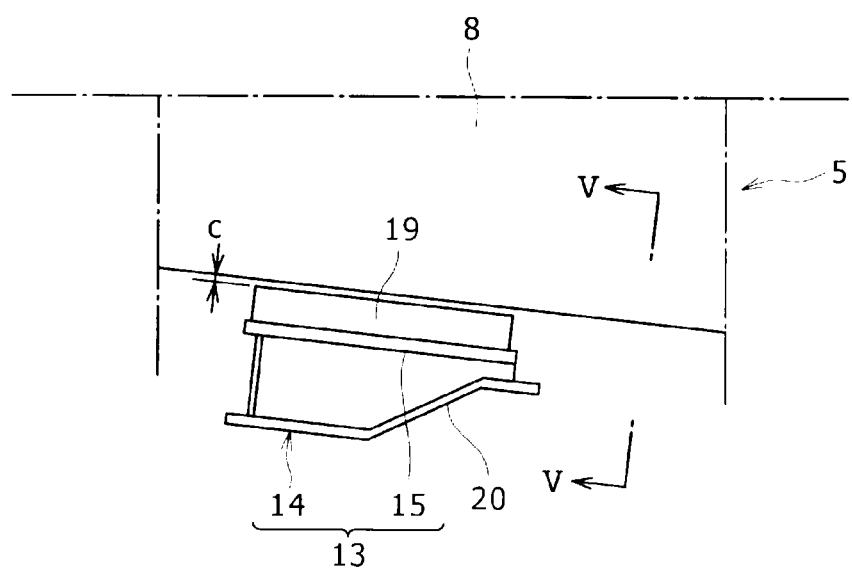
FIG. 4 is a plan view of FIG. 2.
Figure 5:
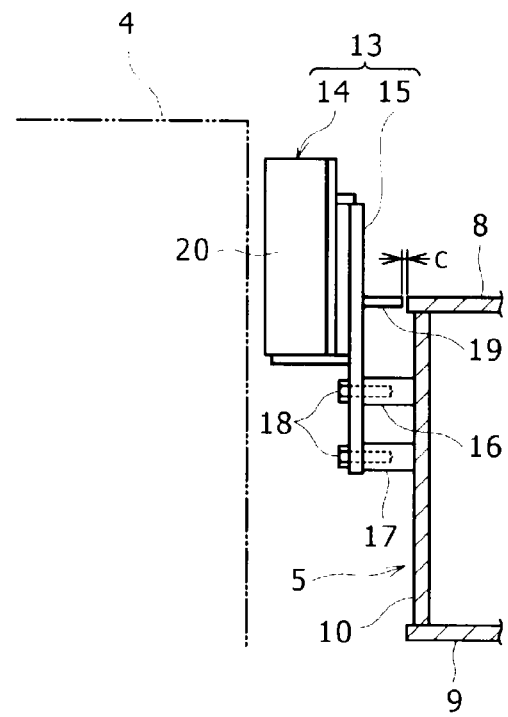
FIG. 5 is a sectional view by the line V-V of FIG. 4.

A load transmission member 13 is provided on a left side surface on the base end side of this boom 5, that is, a side surface (the left side plate 10) facing an upper part on the right front side of the cab 4 when the boom 5 is brought down to the lowest or the vicinity thereof so that the load transmission member 13 adjacently faces a right side surface of the cab 4 (refer to FIG. 5).

As shown in FIGS. 2 to 8 in detail, this load transmission member 13 includes a main body 14 formed into a box shape with closed peripheries (upper, lower, left, right, front and rear surfaces), and a plate-shaped attachment portion 15 provided on a side surface (a right side surface) on the boom side of this main body 14. The load transmission member is attached as follows:

(I) The attachment portion 15 is attached to the main body 14 in a state that a lower part thereof projects downward from the main body 14. This downward projecting part of the attachment portion 15 (a lower part of the entire member) is attached to thick-plate-shaped upper and lower mounts 16, 17 with a plurality of upper and lower bolts 18, the mounts 16, 17 being fixed to the left side plate 10 of the boom 5 by welding or the like.

Thereby, the load transmission member 13 is elastically deformable in the left and right directions taking a boom attachment point (precisely, a part to be attached to the upper mount 16) as a supporting point. Moreover, the load transmission member is attachable to and detachable from the boom 5 by attaching and detaching the bolts 18.

(II) At a position which is rather upper from the middle part on a surface (a right side surface) on the boom side of the attachment portion 15, a projection piece 19 projecting toward the boom is provided over the substantially entire width of the load transmission member 13 in the front and rear direction. A clearance c is formed between this projection piece 19 and a (left) end surface 8a on the cabin side of the top plate 8 of the boom.

Thereby, the load transmission member 13 is elastically deformable within the clearance c and toward the boom.

A rear receiving surface 20 formed into a surface inclined downward toward the base end of the boom when seen from above is provided on the rear side of the main body 14.

Figure 6A:
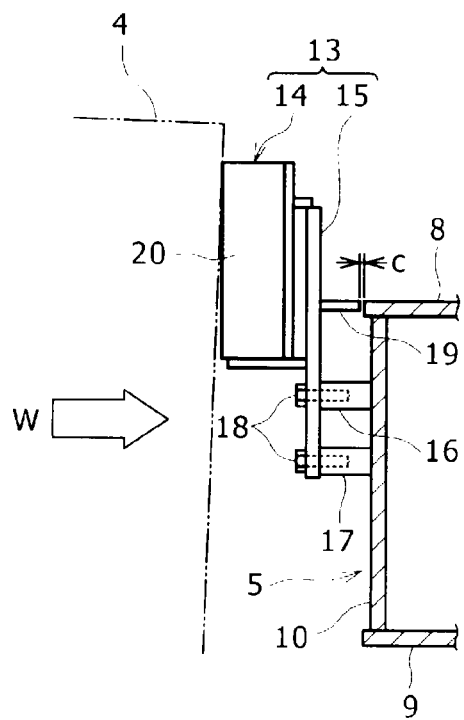
FIG. 6A is a view corresponding to FIG. 5, showing a state that a cab is brought into contact with a load transmission member from a state of FIG. 5.

In this configuration, when a lateral load W is applied to the cab 4 at the time of the rollover of the machine as shown in FIG. 6A, firstly, the cab 4 is inclined and brought into contact with the main body 14 of the load transmission member 13, and the lateral load W is started to be transmitted to the load transmission member 13.

At this stage, the clearance c is maintained between the projection piece 19 and the left end surface 8a of the top plate 8 of the boom.

Figure 6B:
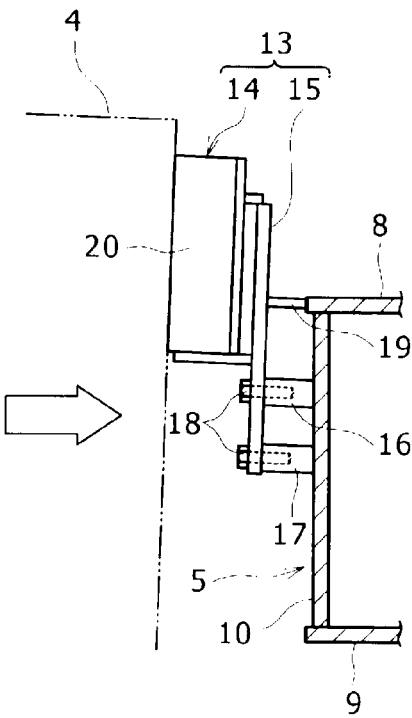
FIG. 6B is a view corresponding to FIG. 5, showing a state that the load transmission member is elastically deformed so as to be brought into contact with the boom.

At the next stage, the load transmission member 13 is elastically deformed toward the boom (the right side) by the lateral load W as shown in FIG. 6B, and the lateral load W is transmitted to the boom 5 at a time point when no clearance c is left.

Thereby, the lateral load W is received by the boom 5. Therefore, further deformation (lateral movement) of the cab 4 is suppressed, and DLV in the cab 4 is ensured.

In a case where the load from the rear side is imposed on the cab 4 due to another form of rollover of a machine main body, the upper part on the right front side of the cab 4 is brought into contact with the rear receiving surface 20 of the load transmission member 13. Therefore, this rear load is also applied to the load transmission member 13 and received by the boom 5 via the load transmission member 13.

In such a way, at the time of the rollover of the machine main body, the load transmission member 13 is elastically deformed within the clearance c and then brought into contact with the boom 5 serving as the load receiving member, so that a load transmission action is started. Therefore, energy of the lateral load W is absorbed by an elastic deformation action of the load transmission member 13, so that the lateral load W itself imposed on the cab 4 can be reduced by this energy absorption function.

Thus, an effect of suppressing the deformation of the cab 4 can be enhanced.

In this case, the load transmission member 13 is not plastically deformed but elastically deformed taking the attachment point to the boom 5 as the supporting point, so as to exert the energy absorption function. Therefore, in comparison to a case where the same function is obtained by plastic deformation, the load transmission member 13 is surely deformed in the substantially same direction irrespective of variation in strength of the load transmission member 13, a manner of imposing a load and the like, so as to exert the energy absorption function and a load transmission function.

The projection piece 19 is provided on the load transmission member 13, and the clearance c is formed between this projection piece 19 and the boom 5. Therefore, a part to be brought into contact with the boom 5 is determined to be the projection piece 19. Thus, the load transmission action is surely performed. Size of the clearance c is easily controlled, and the load transmission member 13 is easily attached to the boom 5.

In this case, since the projection piece 19 is brought into contact with the end surface 8*a* on the cab side of the top plate 8 of the boom, there is no fear that the load receiving member (the top plate 8 of the boom) itself is deformed, and the effect of suppressing the deformation of the cab is surely obtained.

Further, even in a case where the machine is rolled over not just sideways but in a rather-twisted state due to an influence of a counterweight 7, so that the left rear side of the cab 4 first touches the ground, and thus the load is applied to the cab 4 from the obliquely rear side, the energy absorption function and the load transmission function can be exerted by the rear receiving surface 20.

Particularly, the rear receiving surface 20 is not formed into a vertical surface but into a surface inclined downward toward the base end of the boom when seen from above. Therefore, even when the deformation of the cab varies, the rear receiving surface 20 is surely brought into contact with the cab 4, so as to exert the energy absorption function and the load transmission function.

In addition, since the load transmission member 13 is formed by the main body 14 formed into a box shape with the closed peripheries, and the attachment portion 15 to be attached to the boom 5, the entire load transmission member 13 is light. Therefore, required strength and rigidity can be ensured while suppressing an increase in the total weight of the boom, and the load transmission function can be surely exerted.

The load transmission member 13 is detachably attached to the boom 5 by the bolts. Therefore, the load transmission member 13 can be removed from a machine which is to clear the ROPS standard with other configurations (such as a configuration in which a reinforcing frame is attached to the cab 4) and from a machine which is not covered by the standard, and the load transmission member 13 can be exchanged with another member having larger strength at the request of a user.

Other Embodiments (1) Regarding the configuration for transmitting the lateral load W imposed on the cab 4 to the load receiving member, the lateral load W is transmitted to the left end surface 8*a* of the top plate 8 of the boom via the projection piece 19 of the load transmission member 13 in the above embodiment. However, the lateral load W may be transmitted via the projection piece 19 to the left side plate 10 of the boom, or to a hydraulic pipe or a pipe block provided for the boom 5, or to an exclusive load transmission member attached to the boom 5 or the upper frame 3.

Not the projection piece 19 but the main body 14 of the load transmission member 13 may be brought into contact with the load receiving member, so as to perform an energy absorption action and the load transmission action. In this case, the clearance c is formed between the main body 14 and the load receiving member.

(2) Regarding the configuration for absorbing the energy of the lateral load W by the load transmission member 13, elastic deformation of the load transmission member 13 is desirably utilized as in the above embodiment. However, plastic deformation of the load transmission member 13 may be utilized.

(3) The rear receiving surface 20 of the load transmission member 13 may be provided vertically (at right angles to the boom length direction).

(4) The present invention can be widely applied to a construction machine provided with a cab and a working attachment with a boom, including a hybrid excavator, an electric excavator (including a battery excavator having a battery as a power source), and a demolition machine and a crusher which are formed based on an excavator, as well as the hydraulic excavator.

Although the invention has been described with reference to the preferred embodiments in the attached figures, it is noted that equivalents may be employed and substitutions made herein without departing from the scope of the invention as recited in the claims.

What is claimed is:

1. A construction machine, comprising:
a lower traveling body;
an upper rotating body disposed on said lower traveling body rotatably around an axis vertical to a ground;
a working attachment including a boom attached to said upper rotating body;
a cab provided on one of the left and right sides of said working attachment on said upper rotating body;
a load receiving member for receiving a lateral load imposed on said cab toward said boom at the time of rollover of the construction machine; and
a load transmission member for transmitting the lateral load from said cab to said load receiving member, said load transmission member being provided on said boom in a state that a clearance is formed between said load transmission member and said load receiving member, wherein
said load transmission member is attached to said boom in a state that said load transmission member is elastically deformable within the clearance, taking an attachment point to said boom as a supporting point, so that said load transmission member is brought into contact with the load receiving member.

2. The construction machine according to claim 1, wherein a rear receiving surface for receiving a load from the rear side of said load transmission member is provided for said load transmission member.

3. The construction machine according to claim 1, wherein said load transmission member includes a main body, and an attachment portion to be attached to said boom, and said main body is formed into a box shape with closed peripheries.

4. The construction machine according to claim 1, wherein said load transmission member is detachably attached to said boom.

5. A construction machine, comprising:
a lower traveling body;
an upper rotating body disposed on said lower traveling body rotatably around an axis vertical to a ground;
a working attachment including a boom attached to said upper rotating body;
a cab provided on one of the left and right sides of said working attachment on said upper rotating body;
a load receiving member for receiving a lateral load imposed on said cab toward said boom at the time of rollover of the construction machine; and
a load transmission member for transmitting the lateral load from said cab to said load receiving member, said load transmission member being provided on said boom in a state that a clearance is formed between said load transmission member and said load receiving member, wherein
said load transmission member has a projection piece projecting toward said load receiving member, and is provided on said boom in a state that the clearance is formed between said projection piece and said load receiving member.

6. The construction machine according to claim 5, wherein said boom is formed by a top plate, a base plate, and both left and right side plates, and
said load transmission member is attached to said boom in a state that said projection piece faces an end surface on the cab side of said top plate of said boom serving as said load receiving member through the clearance.

7. A construction machine, comprising:
a lower traveling body;
an upper rotating body disposed on said lower traveling body rotatably around an axis vertical to a ground;
a working attachment including a boom attached to said upper rotating body;
a cab provided on one of the left and right sides of said working attachment on said upper rotating body;
a load receiving member for receiving a lateral load imposed on said cab toward said boom at the time of rollover of the construction machine; and
a load transmission member for transmitting the lateral load from said cab to said load receiving member, said load transmission member being provided on said boom in a state that a clearance is formed between said load transmission member and said load receiving member,
wherein a rear receiving surface for receiving a load from the rear side of said load transmission member is provided for said load transmission member, and
wherein said rear receiving surface is formed into a surface inclined downward toward a base end of said boom when seen from above.

* * * * *